(12) United States Patent
Kucmerowski et al.

(10) Patent No.: US 6,205,213 B1
(45) Date of Patent: Mar. 20, 2001

(54) PARTITIONING OF DISPLAY FOR CALLING PARTY NUMBERS

(75) Inventors: Dennis L. Kucmerowski, Delray Beach; David A. Vander Meiden, Boca Raton, both of FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/216,627

(22) Filed: Dec. 16, 1998

Related U.S. Application Data (63) Continuation-in-part of application No. 09/085,365, filed on May 26, 1998, now Pat. No. 5,991,383.

(51) Int. Cl.[7] .............................. H04M 1/56; H04M 15/06

(52) U.S. Cl. ................. 379/142; 379/88.119; 379/88.21; 379/93.23

(58) Field of Search ................................ 379/88.19, 88.2, 379/88.21, 93.23, 120, 127, 142, 354; 455/566

(56) References Cited

U.S. PATENT DOCUMENTS 5,883,942 * 3/1999 Lim et al. .............................. 379/142

* cited by examiner

Primary Examiner—Duc Nguyen (57) ABSTRACT

A system and method for communication information between origination equipment and destination equipment, in which switching signal information is received from a calling party telephone network. Additionally, information is also received from origination equipment for use by destination equipment for displaying calling party numbers. A display for use with the destination equipment receives the information from the calling party telephone network. From the plurality of information received, a first code from the calling party telephone network identifies calling party number information, and a second code from the calling party telephone network identifies partitioning and delineation information of the first code relating to a convention of parsing of telephone numbers associated with the calling party telephone network. The parsing of the calling party numbers into fields introduces field separator characters between the fields including delimiters such as dashes, spaces, parenthetical, graphical characters and the like to separate destination codes from subscriber numbers. In addition, the delineation information can be displayed, for example, in a second display line.

22 Claims, 6 Drawing Sheets

| 49 | — | 89 | — | 722 | — | 34570 |
|---|---|---|---|---|---|---|
| GERMANY | | MUNICH | | OFFICE | | STATION |

FIG. 8

| 4 | 9 | — | 8 | 9 | — | 7 | 2 | 2 | — | 3 | 4 | 5 | 7 | 0 |
|---|---|---|---|---|---|---|---|---|---|---|---|---|---|---|
| C | 0 | — | C | 1 | — | O | F | F | — | S | T | A | T | |

FIG. 9

PARTITIONING OF DISPLAY FOR CALLING PARTY NUMBERS

This is a continuation in part of application Ser. No. 09/085,365, entitled "PARTITIONING OF DISPLAY FOR CALLING PARTY NUMBERS" filed May 26, 1998 U.S. Pat. No. 5,991,383 by Dennis L. Kucmerowski; David Alan Vander Meiden; and Harald Muller.

BACKGROUND OF THE INVENTION

1. Field of the Invention

The present invention relates to calling party number display systems and, more particularly, to a calling party number display system in which information is communicated between the origination equipment and destination equipment for parsing of telephone numbers to be displayed to increase the readability of international numbers and calls from different area codes.

2. Description of the Related Art

Presently, calling party number delivery systems, also known as caller-ID systems, typically only provide an unparsed telephone number of the calling party sent via the originating switching equipment and transported through the telecommunications network to the terminating switching equipment for display at the telephone receiver's device. Partitioning information is not sent through the network. Some terminating switching equipment attempts to provide partitioning of the calling party number using a best guess algorithm for partitioning the received calling party number digits. However, these algorithms often fail to provide the correct partitioning for all calls.

Known algorithms that can provide correct partitioning on a high percentage of calls are generally complicated and require the maintenance of an ever-changing database of numbering plan information, especially for international numbers. Thus, it would be desirable to take advantage of the switching equipment providing the calling party number which is best suited for determining the proper partitioning since it "knows" the numbering plan of the originating user.

Partitioning of displayed information for calling party numbers is a feature that may be used in the telecommunications field. To this end, it would be further desirable to apply such partitioning to a public (National or International) or private network telecommunication systems to improve readability of the calling party number displayed at the telephony users device by partitioning the number into logical fields separated by the field separators commonly used at the location of the display. Such partitioning may be especially helpful for use with international numbers which are of a more flexible format and often more difficult to read without the partitioning. Therefore, it would be advantageous to provide calling party number delivery systems in which information between origination equipment and destination equipment is communicated so as to identify a convention of parsing of telephone numbers associated with the calling party telephone network.

SUMMARY OF THE INVENTION

According to one embodiment of the invention, parsing information is communicated between origination equipment and destination equipment. Switching signal information is received from a calling party telephone network, as well as additional information from the origination equipment for use in displaying calling party numbers with a display at the destination equipment which receives the information from the calling party telephone network. The calling party telephone network thus receives switching signals from the origination equipment and the destination network also receives information from the calling party telephone network for use by the destination equipment. A receiver is provided for receiving a plurality of codes or ISDN protocol from the calling party telephone network identifying calling party number information, partitioning information, and delineation information of the calling party number. Parsing of the calling party numbers into fields introduces field separator characters such as spaces, dashes and parentheses inserted between the fields to separate destination codes representing the telephone numbers for subscriber as various fields according to the convention of the calling party telephone network. In addition the delineation information may be displayed. This information indicates the different code types of each partition, such as a country code, a national destination code, a regional destination code, a subscriber number, etc.

Briefly summarized, the present invention relates to systems and methods for communicating information between origination equipment and destination equipment, in which switching signals are received from the origination equipment via a calling party telephone network. Further information is received from the calling party telephone network for use by the destination equipment for displaying calling party numbers and field delineation information corresponding to the origination equipment. A display for use with the destination equipment is coupled to the destination network for receiving the information from the calling party telephone network. A first code from the calling party telephone network identifies calling party number information, and a second code from the calling party telephone network identifies partitioning and delineation information of the first code relating to a convention of parsing of telephone numbers associated with the calling party telephone network.

These and other objects and advantages are realized by partitioning calling party numbers using information communicated to identify a convention of parsing of the telephone numbers associated with the calling party telephone network.

BRIEF DESCRIPTION OF THE DRAWINGS

A better understanding of the present invention can be obtained when the following detailed description is considered in conjunction with the following drawings in which.

DETAILED DESCRIPTION OF THE INVENTION

Figure 1:
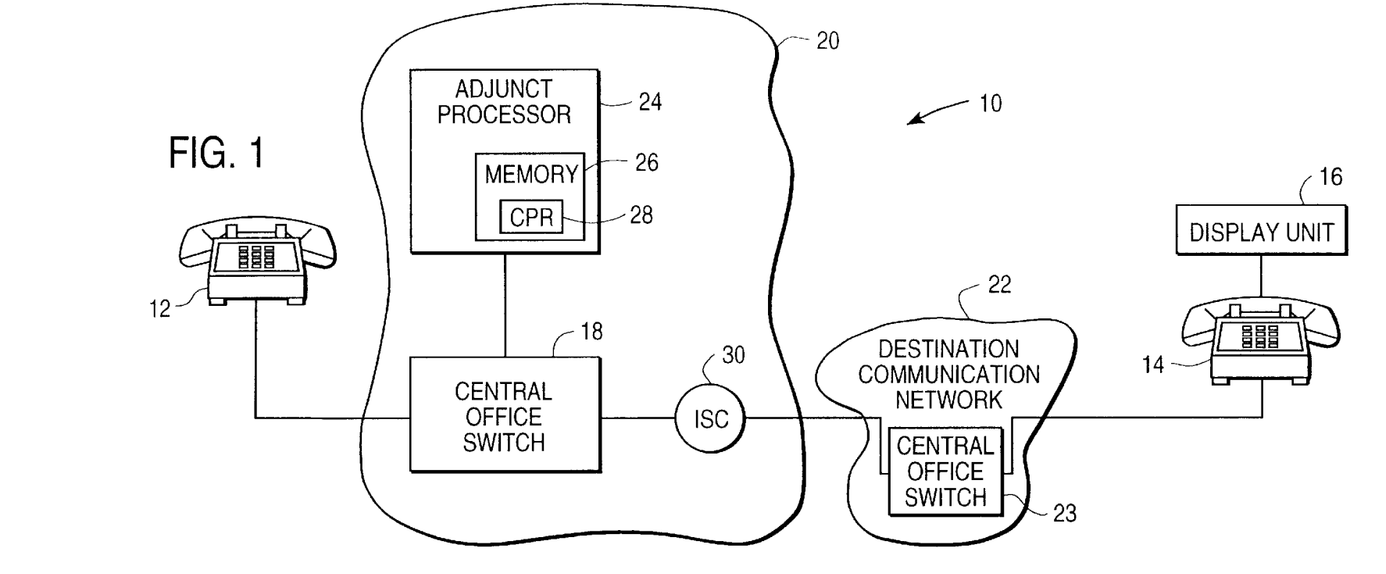
FIG. 1 is a block diagram illustrating a communication system between origination equipment and destination equipment identifying a convention of parsing of telephone numbers associated with the calling party telephone network.

Turning now to the drawings and especially to FIG. 1, a diagram of one embodiment for a system 10 for communicating information between origination equipment, i.e., telephone 12 and destination equipment, i.e., telephone 14, is shown. As discussed further below, a display unit 16 is provided as being responsive to a plurality of codes from a calling party telephone network 20 for displaying the calling party number of, e.g., the telephone 12.

A central office switch 18 stores in its memory a routing table that correlates a port number and a line identification number to a telephone number. When call set-up information for an outgoing call is received by the central office switch 18 via a particular line and through a particular port, the central office switch 18 uses its routing table to identify the calling party number associated with that call. Similarly, the routing table may allow the central office switch 18 to identify a particular port and a particular line by mapping the called party number to the port and line identification numbers in the routing table.

Also connected to the central office switch 18 may be an adjunct processor 24; a general purpose computer that executes instructions stored in a memory 26. Those instructions include the telephone number generating software and the call processing instructions. The adjunct processor 24 of FIG. 1 includes a computer system with disk storage which receives routing data from the signaling network associated with the central office switch 18. The adjunct processor 24 provides a database management system for retrieving and processing call handling instructions for a specific subscriber based on a set of parameters, which may include the routing table, known as the Call Processing Record, CPR 28.

In FIG. 1, a station set telephone 12 located at the originating site, for example, an originating country, is shown connected to the calling party telephone network 20 of that country. A network 20 is served by International Switching Center (ISC) 30 which is a point of egress for outbound international calls from the originating country. The International Switching Center 30 couples to a network in a destination country, e.g., destination communication network 22 serving station set telephone 14, performs two primary functions. Namely, it operates as the point of entry for international traffic to be switched on inter-exchange carrier network and it served as the access point to the Common Channel Signaling network for international calls. The destination network 22 may thus include one or more central office switches or PBXs 23. The Common Channel Signaling network is a packet switching network used to exchange call handling messages between processor-driven switching systems according to a specific protocol such as CCS7 or CCS7 ISUP. The signaling network is composed of a plurality of interconnected nodes. It is noted that, while illustrated as international networks, the invention is equally adapted for purely domestic calls in a public telephone network and calls in a private telephone network. Thus, FIG. 1 is exemplary only.

Figure 2:
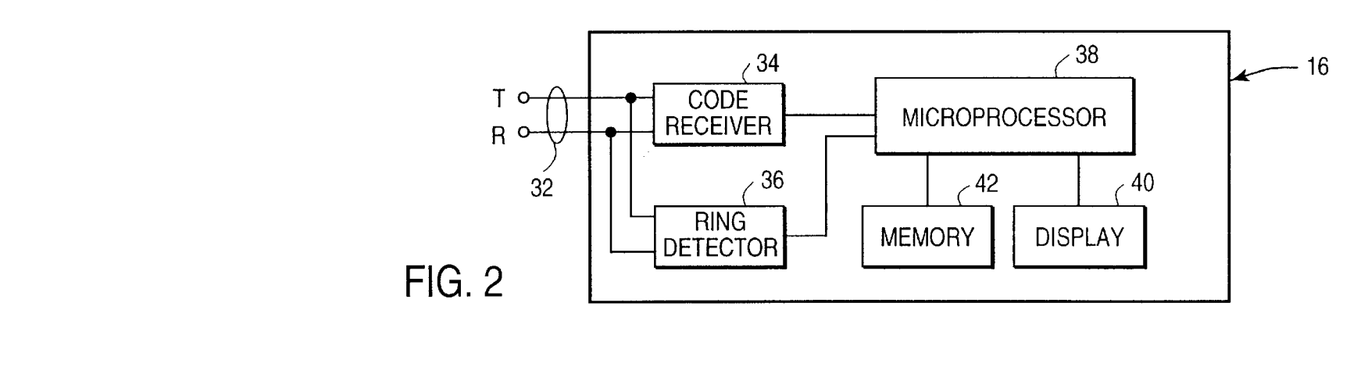
FIG. 2 shows a block diagram of the display unit of FIG. 1 responsive to plural codes from the calling party telephone network for displaying calling party numbers corresponding to the origination equipment.

The display unit 16 shown in block diagram form in FIG. 2 is connected in parallel with a pair of external telephone line, tip/ring pair 32, and, e.g., telephone 14 (or any other telecommunication device, such as a fax machine, an e-mail or the like) for picking up the identification information of a calling party transmitted by the telephone lines 32. The additional presence of the identifying apparatus does not affect the standard function of the telephone 14. The display unit 16 includes a microprocessor 38, a display apparatus, e.g., LCD display 40, memory 42, a ringing detector 36 and a code receiver 34. The memory 42 may be a programmable memory, such as an EEPROM. The code receiver 34 and the ringing detector 36 have their input terminals respectively connected to the external telephone lines 32 in parallel for detecting the transmitted signal from the lines 32 and further forward the detected signal to the microprocessor 38. It is noted that the display unit 16 may also be integrated with the telephone 14. Further, the invention is applicable to both analog caller ID units and digital telephones with caller ID, such as ISDN telephones. Thus, FIG. 2 is exemplary only.

The code receiver 34 is electrically connected between the external lines 32 and the microprocessor 38 for receiving the calling party information, converting the information to digital signals and feeding the digital signals to the microprocessor 38. The display 40 is electrically connected to the microprocessor 38 for illustrating the related information such as the telephone number and the name of the calling party and the like as will be described in greater detail.

Partitioning of the display for calling party numbers when applied to a public (National or International) or private network telecommunication system improves the readability of the calling party number displayed at the call receiver's display device by partitioning the number into logical fields separated by a field separator commonly used at the location of the display. This is especially helpful for international numbers which are of a more flexible format and therefore more difficult to read without the partitioning. For example, an international number display for Jakarta, Indonesia, may appear as being a non-partitioned number, e.g., "62215272336," which should actually appear as a corresponding partitioned number, e.g., "62-21-527-2336," according to the local convention in Indonesia. In addition, showing the meaning of each partition which can be different for different countries can increase the readability of the number.

Partitioning and delineation of the display for calling party numbers thus provides the telephone user with improved readability of calling party number information. For the North American Numbering Plan (NANP) number, a first Calling party information code may be provided as, "9547714558," and an additional second partitioning information code that could be provided as "3 3 4" which may be used to generate corresponding display information, i.e., "954-771-4558." In addition, the field delineation information can be provided, for example, after each partition number such as "area code", "office code", and "station number". Instead of sending partitioning and delineation information one single code could indicate a specific country related partitioning information. For example, one code could indicate the NANP and a plurality of codes could indicate different partitioning plans for countries with non constant formats or a flexible format such as Germany. An international example may be provided as: Calling party information "62215272336," and Partitioning information "2 2 3 4", and delineation information "country code", ". "city code", "office code", and "station number" resulting in Display Information: "62-21-527-2336." The last number and the last delineation code of partitioning information may alternatively be provided as a "wildcard" which could indicate that the display should group all remaining digits in the calling party number, e.g., "* " indicating a group all remaining digits, such that: Calling party information "62215272336"; Partitioning information would be "2 2 3 * ", and delineation information "country code", "."city code", "office code", and "* " with the Display Information resulting in "62-21-527-2336."

Another variation of partitioning is: When displaying calling party information using the partitioning information, the remaining digits in the calling party number, which were not specifically indicated to group, shall be displayed as the last group of digits. For example: Group all remaining digits, such that where: The Calling party information is "62215272336," and the Partitioning information is "2 2 3,", and delineation information "country code", "city code", "office code" the resulting Display information may be presented as "62-21-527-2336." If the display has the capability of displaying full text the delineation information can be displayed in a second line. If the display capabilities are limited, such as in a 2 line, 16 character display, the display information can be abbreviated such as CO for "county code", CI for "city code", AR for "area code", OF for "office code", ST for "station number", etc. Examples for the above displays will be explained in more detail later.

The switching equipment providing the calling party number is best suited for determining the proper partitioning since it "knows" the numbering plan and the delineation format of the originating user. This involves adding additional signaling information to the calling party number information (i.e., partitioning information and/or delineation information) that is provided by the originating switching equipment and transported through the telecommunications network to the terminating switching equipment. This additional signaling information indicates where the partitioning for the calling party number should be placed. Upon receipt of the partitioning and delineation information along with the calling party number digits, the terminating switching equipment can easily and accurately display a properly partitioned calling party number for all calls, regardless of their point of origin. In addition the delineation information can be displayed indicating what each of the calling number fields represents. The proposed scheme allows the terminating switch to use the field separators preferred by the called party such as dashes, space characters, parentheses, hearts, crosses, etc.

The program for parsing the received number can also compare some fields with the respective fields of its own destination information. Such, for example, country code and area code do not have to be displayed if they are equal to the destination's own country and area code.

Figure 5:
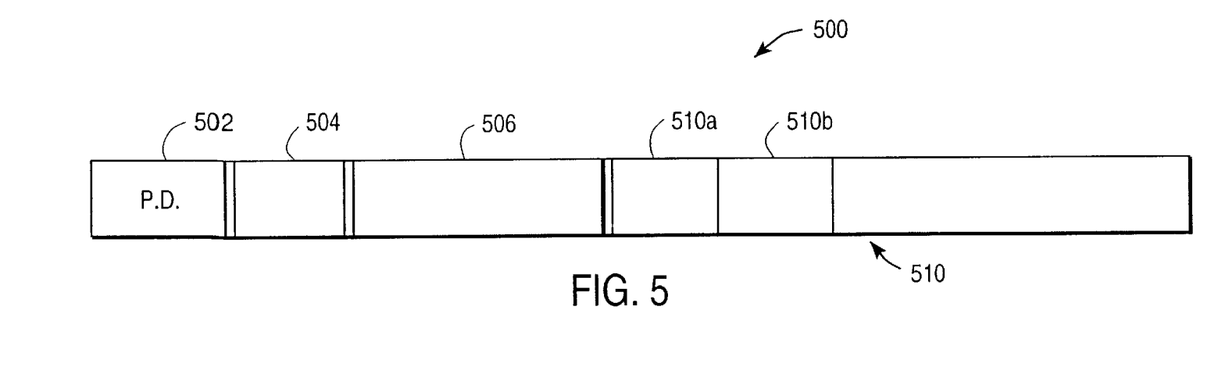
FIG. 5 is a diagram illustrating an exemplary set-up message including partitioning information for caller-ID according to an embodiment of the present invention.

Turning now to FIG. 5, a diagram illustrating an exemplary information field 500 used to transport the parsing and delineation information from the originating switching equipment 20 (FIG. 1) to the destination switching equipment 23, is illustrated. The data field 500 is representative of, for example, an ISDN information field. As is well known, the ISDN information field 500 is a variable length field that contains the Q.931 protocol data used for the establishment, maintenance and termination of network connections between two devices. The information field 500 includes a protocol discriminator field 502 that identifies the layer three protocol, such as Q.931 user-network call control. A call reference field 504 is provided to uniquely identify each call on the user network interface. A message type field 506 is provided to identify the message type such as SETUP, ALERT, CONNECT and the like. The message type determines what additional information will follow. Finally, a variable length information element field 510 is provided. According to the present invention, when the message type field 506 indicates a SETUP message, a parsing subfield 510a is provided in association with the calling party number information contained within the information field 510. The parsing subfield 510a and a delineation subfield 510b identify parsing and delineation information provided by the originating switch 18.

In another embodiment only one subfield, for example, subfield 510a is used which contains a single code indicating a specific numbering plan according to a predefined list of numbering plans, or a combined parsing and delineation information.

Figure 6:
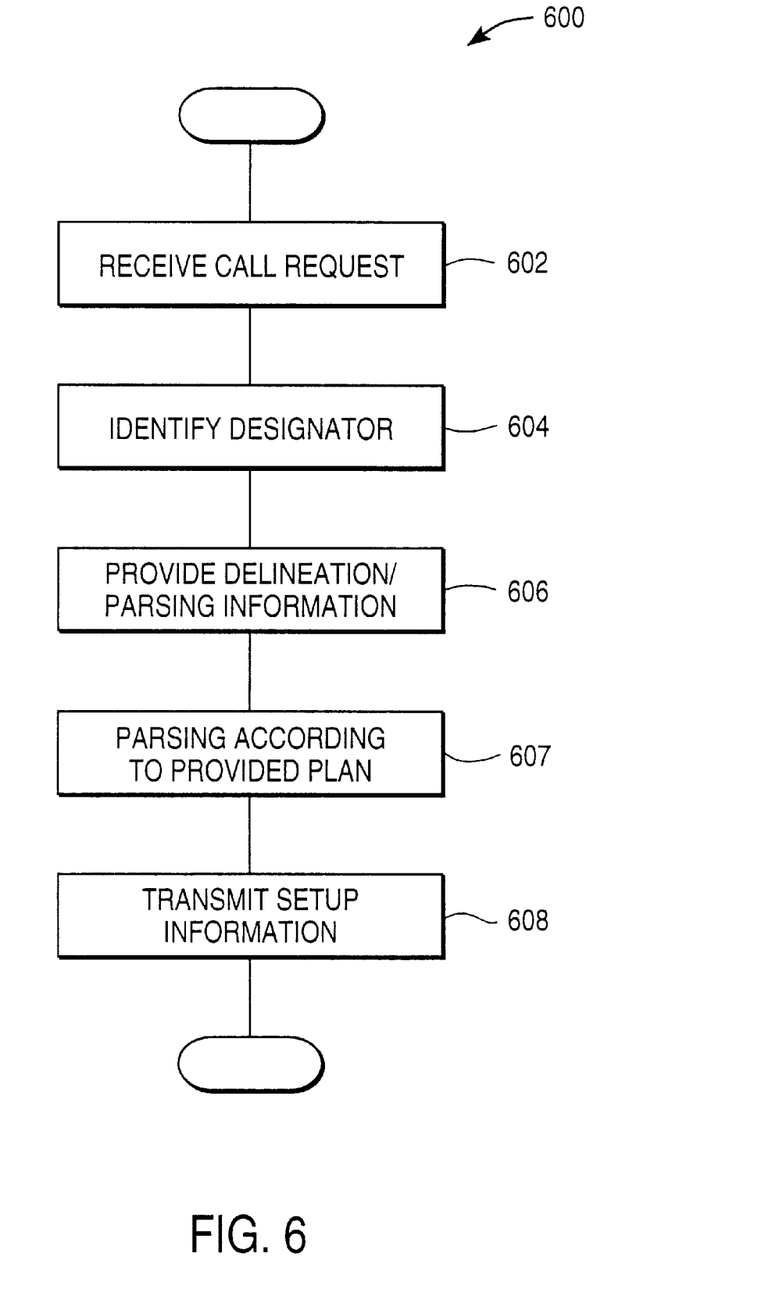
FIG. 6 is a flowchart illustrating partitioning information set-up according to the present invention.

Turning now to FIG. 6, a flowchart 600 illustrating an exemplary embodiment of the present invention for packing a partitioning field is shown. In particular, in a step 602 the originating switch 18 (FIG. 1) and adjunct processor 24 receive a call request from a telephone. Part of the call request, of course, is the outgoing telephone number which is used in a step 604 to identify the destination of the call. The adjunct processor 24 accesses the memory 26 to provide parsing and delineation of the originating number in a step 606. In a step 607, the system evaluates the parsing and delineation information and therefore determines the numbering plan. The delineation information obtained defines the numbering plan and what the different number fields represent. In accordance with this information the parsing will be conducted in step 607. For example, if the delineation indicates a private call, then the parsing will be based on the private numbering plan. Otherwise, if the delineation information indicates a domestic call, then parsing will be accomplished according to the North American numbering plan assuming the destination station is within the U.S.A. If the call is an International call, then the International codes such as Country code and City code, etc. derived from the delineation information will be used accordingly. Finally, in a step 614 the system transmits the set-up information including the parsed information from FIG. 5.

As discussed above, parsing and delineation information may be sent by the calling network in the form of a sequence of integer numbers indicating the number of digits constituting the size of each field. The delineation information can be sent in either plain text information or coded whereby different codes indicate different representations of a field. Note that the integer numbers representing the parsing and delineation information may be encoded and transported through the network in a form that is most appropriate for the signaling system being used. For example, the parsing and delineation information may be encoded using IA5 (International Alphabet 5) characters, BCD (binary coded decimal) values, binary values or in-band (e.g., multi-frequency) tones. As another example, the international calling party number "15619973760" received in Germany could be followed by the following parsing information:

1 (parsing for 1-digit)
A (indicating a country code for "1")
3 (parsing for 3-digits)
B (indicating a National destination code for "561")
3 (parsing for 3-digits)
C (indicating a regional destination code for "997")
4 (parsing for 4-digits)

D (indicating a subscriber number for "3760")

Providing this kind of parsing and delineation information is the most flexible and does not need any adaptation to new numbering plans as exactly this information will be transmitted.

On the other hand, less data has to be transmitted using a combined parsing and delineation information. An example for a combined parsing and delineation information is shown below. Predefined codes would then indicate different kind of numbering plans and representations for each field, such as:

US1—indicating a NANP

DE1—indicating an international call from Germany using a 2-digit country code, a 2-digit city code, a 3 digit office code, and a 5 digit station number;

DE5—indicating an international call from Germany using a 2-digit country code, a 4-digit city code, and a 7 digit station number;

etc.; of course, any kind of coding could be used to represent different numbering plans.

The destination uses a data base storing the information about parsing and delineation for each code. In case of a change in a public telephone numbering plan of a country the respective data base has to be updated. The destination switching equipment in Germany, based on the received parsing information, could format the number in the locally customary fashion by inserting the hyphen delimiter ("-" character) behind the first, the fourth and the seventh digit. The destination switching equipment in Germany would display this number to the telephone user as follows: "1-516-997-3760."

In another example, the national number "4084923911" would be sent by the originating switch with the parsing information:

3 (parsing for 3-digits)

B (indicating a National destination code for "408")

3 (parsing for 3-digits)

C (indicating a Regional destination code for "492")

4 (parsing for 4-digits)

D (indicating a Subscriber number for "3911")

The destination switching equipment in Boca Raton, Fla., based on the received parsing information, could format the number in the locally customary fashion by encapsulating the first three digits in parentheses and hyphen delimiter ("-" character) behind the sixth digit. The destination switching equipment in Boca Raton would display this number to the telephone user as follows: "(408) 492-3911."

Figure 3:
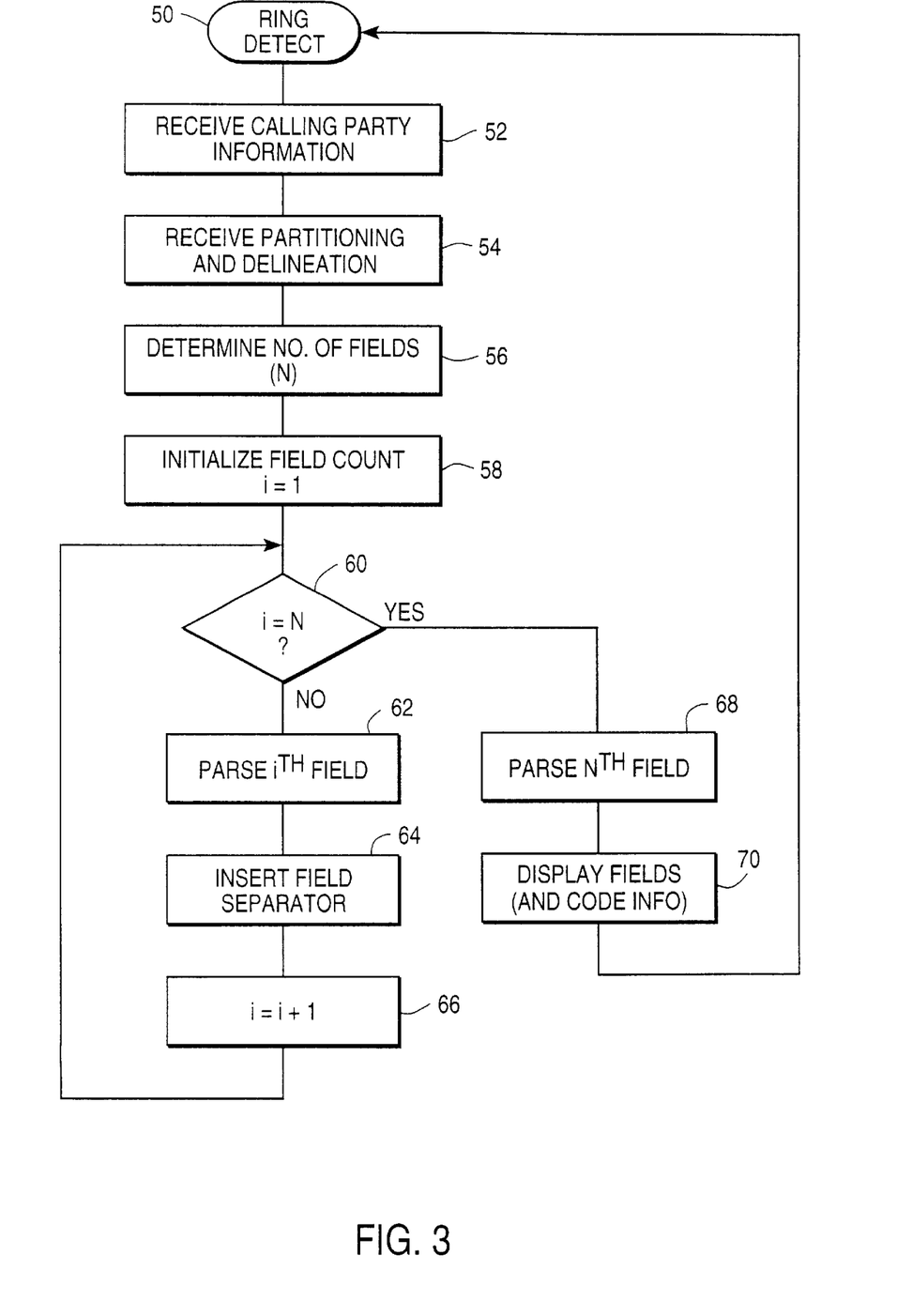
FIG. 3 is a program flowchart for software used with the microprocessor of the display unit in accordance with the present invention.

Referring now to the program flowchart of FIG. 3, the microprocessor 38 (FIG. 2) controls the ring detector 36 to determine a ring detect signal at block 50, upon which block 52 is used to receive calling party information while receiving switching signals from the origination equipment via the calling party telephone network 20. At block 54, the microprocessor 38 receives partitioning and delineation information from the calling party telephone network 20 for use by the destination equipment, steps 52 and 54 are receiving a plurality of codes from the calling party telephone network 20 identifying calling party number information and also identifying partitioning and delineation information of the calling party telephone number. At step 56, a determination of the number of information fields, N (and characters per field), is derived from the partitioning information to determine a Number of fields of the telephone number from the calling party telephone network 20.

At step 58, a field counter is initialized. For each field, the system groups the numbers associated with that field until all of the fields have been parsed in steps 60–66. In particular, at step 60, a comparison between the count i and the number of fields, N, is made to determine whether the parsing operation is complete. If the parsing is not complete, the "ith" field is parsed as step 62. After each field is parsed, a field separator, such as a dash or parenthesis, appears in the form of characters between the fields of the calling party telephone number. After each field is parsed, the field counter "i" is incremented by one at step 66, and program flow returns to step 60 where a comparison between the field count and the number of fields "N" again is made.

Figure 7:
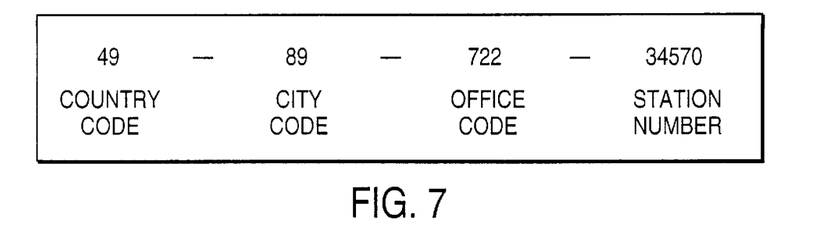
FIG. 7 is a first example of a display showing the information according to the present invention.
Figure 8:
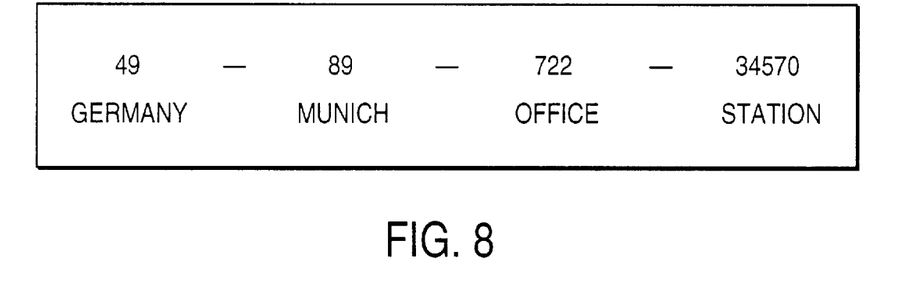
FIG. 8 is a second example of a display showing the information according to the present invention.
Figure 9:
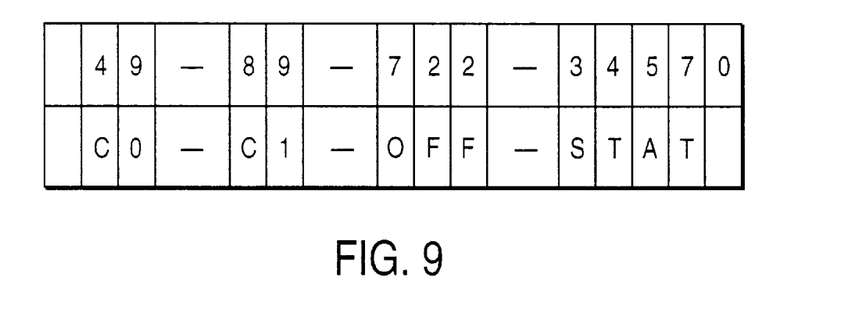
FIG. 9 is a third example of a 2 line, 16 character display showing the information according to the present invention.

If the field counter equals the number of fields N, program flow continues at block 68 at which the parsing of the "Nth" field occurs, and block 70 is provided for displaying the calling party telephone number for use with the destination equipment, e.g., telephone 14 and display unit 16, being coupled to the destination network 22 for receiving the information from the calling party telephone network 20. The delineation information can be showed on a display as shown in FIGS. 7–9. FIG. 7 shows a full text version of the representations displayed under each number field. In FIG. 8 a data base is used to interpret the different number fields according to the delineation information. Thus, for example, the second line can show that "49" stands for Germany, "89" stands for Munich, "722" is an office code, and "34570" is the station number. Of course the data base can include also representations for the office code and the station code. FIG. 9 shows a display having limited displaying capabilities. Here, a 2-lines, 16 character display is depicted as often used in mobile handsets. In this case abbreviations are used to indicate what each field represents. For example, "CO", stands for country code, "CI" stands for city code, "OFF" stands for office code, "STAT." stands for station number.

Figure 3A:
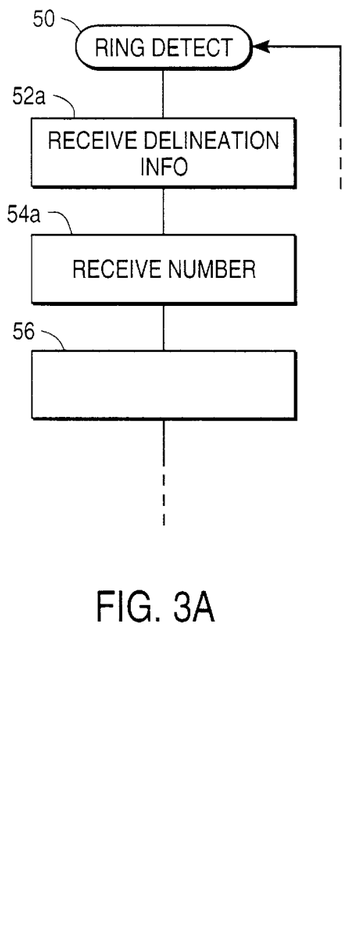
FIG. 3a is a partial program flowchart showing a variation according to the flowchart of FIG. 3.

FIG. 3a shows a variation of FIG. 3 where first the partitioning and delineation information is sent in step 52a and secondly in step 54a the callers number. Again, partitioning information can be combined with the delineation code in any appropriate way. Also, instead a numbering plan code can be used as explained above.

Figure 3B:
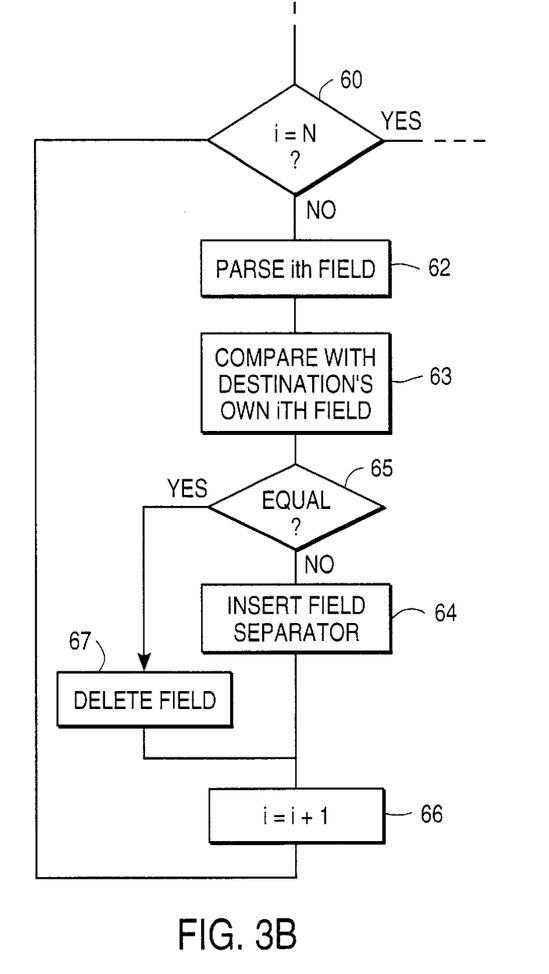
FIG. 3b is another partial program flowchart showing a variation according to the flowchart of FIG. 3.

FIG. 3b shows another variation of FIG. 3. After parsing the $1^{st}$ field a comparison of the $1^{st}$ field including its delineation information with the destinations own first field and delineation information is being done in step 63. In step 65 program flow branches to step 67 if true. The first field, for example an area code, would then be deleted if identical to the destination's own area code. Otherwise, program flow continues with step 64 where a field separator would be inserted. Step 66 as described in FIG. 3 follows. Thus all redundant information would not be displayed. Of course, the comparison and the respective following steps are only conducted if the first and eventually the following fields are equal to the destination's own fields. Any gap would terminate the comparison, for example, in an international number, if the country code equal but the city code was not equal, then only the country code would not be displayed and the comparison would stop because the office codes belong to different city codes.

Figure 4:
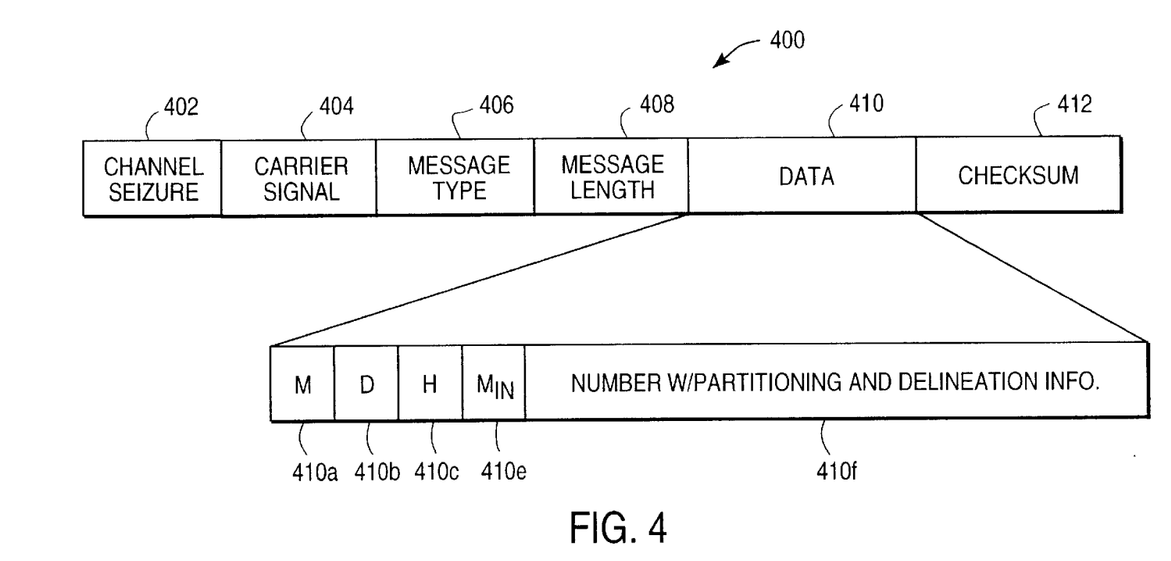
FIG. 4 is a diagram illustrating an exemplary caller-ID data message according to an embodiment of the invention.

The parsing information may be carried in an exemplary caller-ID data message received by the receiving party, as illustrated in FIG. 4. As is known, the data message 400 is provided during the first four seconds silent interval in the ringing cycle. The caller-ID delivery may employ a protocol using 8-bit words each bounded by start bit and a stop bit. The data message 400 includes a channel seizure signal 402 and a carrier signal 404, as are known in the art. The message-type word 406 identifies a message as referring to a caller identification data message. The message length word 408 specifies the total number of data words to follow. The data words may be encoded in ASCII and represent or include a month field 410*a,* a day field 410*b,* an hour field 410*c,* a minute field 410*e,* and a directory number and partitioning and delineation field 410*f.*

What is claimed is:

1. A communications system for communicating information between origination equipment and destination equipment, comprising:

means associated with said destination equipment for receiving a first code identifying calling party number information;

means for receiving a second code identifying partitioning information and delineation information of the first code relating to a convention of parsing of telephone numbers associated with the calling party telephone network; and a display configured to display parsed calling party numbers corresponding to the origination equipment.

2. A system as recited in claim 1, wherein said second code receiving means provides information for separating the calling party number information into fields according to the delineation information.

3. A system as recited in claim 1, wherein said second code receiving means receives parsing information sent by the calling party telephone network in the form of a sequence of integer numbers indicating the number of digits constituting the size of each field.

4. A system as recited in claim 3, wherein said delineation information follows each integer number.

5. A system as recited in claim 2, wherein said second code receiving means receives parsing information sent by the calling party telephone network in the form of a sequence of integer numbers indicating the type of each field and the number of digits constituting the size of each field.

6. A system as recited in claim 1, comprising means for generating display information from said calling party number information, said partitioning information, and said delineation information.

7. A system as recited in claim 6, wherein the parsing information and the delineation information of said second code is encoded in a means for receiving switching signals from the origination equipment of the calling party telephone network.

8. A system as recited in claim 7, wherein the encoded parsing information and the delineation information comprises international alphabet characters, binary coded decimal values or in-band signaling such as multi-frequency tones.

9. A system as recited in claim 6, wherein the last number of partitioning information of said second code receiving means sequence of integer numbers comprises a wildcard character for the size of the last field.

10. A system as recited in claim 6, wherein the remaining digits in the calling party telephone number which were not specifically indicated in the number of the partitioning information and in said delineation information of said second code comprise the last field indicated as a station number.

11. A system as recited in claim 6, wherein the parsing of the calling party number information into fields by said generating means introduces field separator characters between the fields including delimiters such as dashes, spaces, parenthetical or graphical characters for displaying calling party numbers.

12. A system as recited in claim 11, wherein the parsing of the calling party number provides delimiters between fields to separate destination codes from subscriber numbers according to a regional telephone numbering convention.

13. A system as recited in claim 12, wherein the parsing of the calling party number provides delimiters between international, country, national or regional code fields and said delineation information specifies said code fields.

14. A system as recited in claim 12, wherein the parsing of the calling party number provides delimiters between fields according to the North American Numbering Plan and said delineation information indicates code fields consistent with the North American Numbering Plan.

15. A system as recited in claim 6, wherein said means for generating display information include comparing means to display only non-redundant information of said first code based upon information related to said destination equipment.

16. A communication switching system, comprising:

means for receiving calls from origination equipment;

means for identifying a destination for said calls; and means for providing parsing information related to a caller identification of said origination equipment to said destination, wherein said parsing information includes delineation information.

17. A communication switching system according to claim 16, said providing means including means for coding said parsing information in the form of a sequence of integer numbers, each integer number indicating a type of field and the number of digits in said field according to a convention of telephone numbers.

18. A communication switching system according to claim 17, said coding means including means for coding a wildcard character for a size of a field.

19. A caller identification receiver, comprising:

means for receiving caller-ID information, and means for displaying said caller-ID information in a partitioned format indicating a field delineation for each partition;

said receiving means including means for receiving information related to a convention of parsing of telephone numbers associated with a calling party telephone network.

20. A caller identification system according to claim 19, said partitioning information including wildcard information for the size of one or more fields of said telephone numbers.

21. A caller identification system according to claim 20, said information including means for identifying the last partition when a specific size for the last partition field is not provided.

22. A caller identification receiver, comprising:

means for receiving caller-ID information, and means for displaying said caller-ID information in a partitioned format indicating a field delineation for each partition;

said displaying means include comparing means to display only non-redundant information of said caller ID information based upon information related to said destination equipment.

* * * * *